(12) United States Patent
Colby et al.

(10) Patent No.: US 9,580,626 B2
(45) Date of Patent: Feb. 28, 2017

(54) SYSTEMS FOR SECURING PROTECTIVE FILMS TO SURFACES OF SUBSTRATES

(71) Applicant: ZAGG Intellectual Property Holding Company, Inc., Salt Lake City, UT (US)

(72) Inventors: Jim A. Colby, Highland, UT (US); Gregory E. Booth, Hilliard, UT (US)

(73) Assignee: ZAGG Intellectual Property Holding Co., Inc., Salt Lake City, UT (US)

( * ) Notice: Subject to any disclaimer, the term of this patent is extended or adjusted under 35 U.S.C. 154(b) by 0 days.

(21) Appl. No.: 14/750,370

(22) Filed: Jun. 25, 2015

(65) Prior Publication Data

US 2015/0291854 A1 Oct. 15, 2015

Related U.S. Application Data

(63) Continuation-in-part of application No. 13/865,175, filed on Apr. 17, 2013, and a continuation-in-part of application No. 13/166,745, filed on Jun. 22, 2011.

(Continued)

(51) Int. Cl.
*B29C 65/48* (2006.01)
*B32B 37/12* (2006.01)

(Continued)

(52) U.S. Cl.
CPC ......... *C09J 7/0225* (2013.01); *B29C 63/0004* (2013.01); *B29C 63/0047* (2013.01); *B29C 63/02* (2013.01); *B32B 3/02* (2013.01); *B32B 7/06* (2013.01); *B32B 7/12* (2013.01); *B32B 27/08* (2013.01); *B32B 27/283* (2013.01); *B32B 27/304* (2013.01); *B32B 27/306* (2013.01); *B32B 27/308* (2013.01); *B32B 27/32* (2013.01); *B32B 27/36* (2013.01); *B32B 27/40* (2013.01); *C09J 7/0296* (2013.01); *B29C 2063/0008* (2013.01); *B29C 2063/027* (2013.01); *B29L 2031/3437* (2013.01); *B29L 2031/3475* (2013.01); *B32B 2307/41* (2013.01); *B32B 2307/412* (2013.01); *B32B 2307/414* (2013.01);

(Continued)

(58) Field of Classification Search
USPC ................................................. 156/249, 289
See application file for complete search history.

(56) References Cited

U.S. PATENT DOCUMENTS

| 8,655,481 | B2 * | 2/2014 | Sheu | ................. B29C 45/14024 700/119 |
| 2004/0246386 | A1 * | 12/2004 | Thomas | .................... B32B 7/06 348/818 |

(Continued)

*Primary Examiner* — Sing P Chan
(74) *Attorney, Agent, or Firm* — Durham Jones & Pinegar, P.C. Intellectual Property Law Group

(57) ABSTRACT

Systems and films for protecting surfaces of various substrates, including electronic devices, such as portable electronic devices, include a liner with a strip liner and a main liner. The strip liner, which covers a small strip of adhesive on the back side of a protective film, is configured to be removed before the main liner. With the small strip of adhesive exposed, the protective film may be aligned with a substrate and, if necessary, removed from the substrates and repositioned thereon. Thereafter, the main liner may be removed to enable complete application of the protective film to the substrate. Methods for securing protective films to substrates are also disclosed.

20 Claims, 6 Drawing Sheets

Related U.S. Application Data

(60) Provisional application No. 61/625,550, filed on Apr. 17, 2012, provisional application No. 61/357,972, filed on Jun. 23, 2010, provisional application No. 61/357,427, filed on Jun. 22, 2010.

(51) Int. Cl.

| | | |
|---|---|---|
| *B32B 37/26* | (2006.01) | |
| *B32B 38/10* | (2006.01) | |
| *C09J 7/02* | (2006.01) | |
| *B32B 7/06* | (2006.01) | |
| *B32B 7/12* | (2006.01) | |
| *B32B 27/08* | (2006.01) | |
| *B32B 27/28* | (2006.01) | |
| *B32B 27/30* | (2006.01) | |
| *B32B 27/32* | (2006.01) | |
| *B32B 27/36* | (2006.01) | |
| *B32B 27/40* | (2006.01) | |
| *B29C 63/00* | (2006.01) | |
| *B29C 63/02* | (2006.01) | |
| *B32B 3/02* | (2006.01) | |
| *B29L 31/34* | (2006.01) | |
| *G06F 1/16* | (2006.01) | |
| *H04M 1/02* | (2006.01) | |
| *H04M 1/18* | (2006.01) | |

(52) U.S. Cl.
CPC ..... *B32B 2307/518* (2013.01); *B32B 2457/00* (2013.01); *C09J 2201/122* (2013.01); *C09J 2201/162* (2013.01); *C09J 2475/006* (2013.01); *G06F 1/1626* (2013.01); *G06F 1/1656* (2013.01); *G06F 2200/1634* (2013.01); *H04M 1/0266* (2013.01); *H04M 1/18* (2013.01); *H04M 1/185* (2013.01); *Y10T 428/1471* (2015.01)

(56) References Cited

U.S. PATENT DOCUMENTS

2009/0186181 A1* 7/2009 Mase ................ B29C 63/02
428/40.1
2012/0057287 A1* 3/2012 Chaves ................ C09J 7/0239
361/679.3

* cited by examiner

SYSTEMS FOR SECURING PROTECTIVE FILMS TO SURFACES OF SUBSTRATES

CROSS-REFERENCE TO RELATED APPLICATIONS

This application is a continuation-in-part of U.S. application Ser. No. 13/865,175, filed on Apr. 17, 2013 and titled DRY APPLY PROTECTIVE SYSTEMS AND METHODS ("the '175 Application"). In the '175 Application, a claim for the benefit of priority to the Apr. 17, 2012 filing date of U.S. Provisional Patent Application No. 61/625,550, titled DRY APPLY PROTECTIVE SYSTEMS AND METHODS ("the '550 Provisional Application") as made pursuant to 35 U.S.C. §119(e). The '175 Application is also a continuation-in-part of U.S. patent application Ser. No. 13/166,745, titled PROTECTIVE FILMS FOR DRY APPLICATION TO PROTECTED SURFACES, INSTALLATION ASSEMBLIES AND KITS INCLUDING THE FILMS, DEVICES PROTECTED WITH THE FILMS, AND ASSOCIATED METHODS, filed on Jun. 22, 2011 ("the '745 Application"), in which claims were made for the benefit of priority to U.S. Provisional Patent Application 61/357,972, titled PROTECTIVE FILMS FOR DRY APPLICATION TO PROTECTED SURFACES, INSTALLATION ASSEMBLIES AND KITS INCLUDING THE FILMS, DEVICES PROTECTED WITH THE FILMS, AND ASSOCIATED METHODS and filed on Jun. 23, 2010 ("the '972 Provisional Application") pursuant to 35 U.S.C. §119(e) and to U.S. Provisional Patent Application 61/357,427, titled PROTECTIVE FILMS FOR DRY APPLICATION TO PROTECTED SURFACES, INSTALLATION ASSEMBLIES AND KITS INCLUDING THE FILMS, DEVICES PROTECTED WITH THE FILMS, AND ASSOCIATED METHODS and filed on Jun. 22, 2010 ("the '427 Provisional Application") pursuant to 35 U.S.C. §119(e). The entire disclosure of each of the '175 Application, the '427 Provisional Application, the '972 Provisional Application, the '745 Application and the '550 Provisional Application is, by this reference, incorporated herein.

TECHNICAL FIELD

This disclosure relates generally systems and films for protecting surfaces of various substrates, including electronic devices, such as portable electronic devices. More specifically, this disclosure relates to systems and protective films that may be applied to a surface to be protected without the presence of contaminants or visible air bubbles between the film and the surface and without the use of a solution to eliminate the presence of visible air bubbles. This disclosure also relates to systems for ensuring that protective films are precisely aligned with the surfaces to which they are to be secured. In addition, this disclosure relates to methods for protecting the surfaces of substrates, such as portable electronic devices.

SUMMARY

In various aspects and embodiments, this disclosure relates to systems for protecting surfaces of electronic devices (e.g., portable electronic devices, etc.) and other substrates. Such a system enables the application of a protective film to a surface of an electronic device or another substrate.

In one aspect, such a system includes a protective film with upper and lower surfaces, and a liner adhesively secured to the lower surface of the protective film. The liner, which may also be referred to as a "backing" (see, e.g., the '175 Application), may include two separate or separable elements—a strip liner and a main liner. The strip liner of such a liner may be located over an end of lower surface of the protective film, while the main liner may cover a remainder of the lower surface of the protective film. In addition, such an embodiment of a system for protecting a surface of an electronic device or another substrate may include a cap shield, which is also referred to as an "application tape" (see, e.g., the '175 Application) over the protective film. Optionally, a release layer may be located between the protective film and the cap shield.

In embodiments where a system according to this disclosure includes a cap shield, tabs may be located at opposite ends of the cap shield. The tabs, which may protrude beyond opposite ends of a protective film of the system, may enable alignment of the protective film over the surface.

Such a system may be used by removing the strip liner from the adhesive material-coated lower surface of a protective film to expose a strip of adhesive material, aligning the protective film with the surface to which it is to be secured and, with the protective film and the surface in alignment, securing the strip of adhesive material to the surface. Thereafter, an opposite end of the protective film may be lifted away from the surface. While the protective element is in such an orientation (i.e., an at least partially upright orientation), a linear force may be applied across a width of the portion of the protective film that has been secured to the surface, and then moved toward the end of the protective film that has been lifted. Once the protective film has been secured to the surface in a desired manner (e.g., when there are no or substantially no air bubbles between the protective film and the surface, etc.), a cap shield and a release layer, if any, may be removed from the upper surface of the protective film.

In another aspect, a system may include a protective film and a release layer or another element over the upper surface of protective film, which release layer or other element may be configured to enable precise alignment of the protective film with the surface on which it is to be adhesively secured. Thus, the release layer or other element may also be referred to as an "alignment element." In such a system, the liner and the cap shield, if any, may be transparent and colorless. As a result, the boundaries of a transparent, colorless protective film between the liner and the cap shield may be invisible, or they may be very difficult for an individual to see. By providing an alignment element, such as a release layer, that has the same configuration (e.g., shape, dimensions, etc.) as the protective film, over the protective film in complete superimposition therewith, and that contrasts with (e.g., is transparent and colored, translucent, etc.) and is visible through the liner and the cap shield, the alignment element may enable precise alignment between the protective film and the surface to which the protective film is to be adhesively secured.

In use, at least a portion of a liner of such a system may be removed from an adhesive material-coated lower surface of the protective film and the surface to which the protective film is to be applied may be visualized through the alignment element, which may enable precise alignment of the alignment element and, thus, the protective film with the surface. With the alignment element and the protective film properly aligned, the protective film may be secured to the surface. The alignment element may then be removed from the upper surface of the protective film.

Other aspects, as well as features and advantages of various aspects, of the disclosed subject matter will become apparent to those of ordinary skill in the art through consideration of the ensuing description, the accompanying drawings and the appended claims.

DETAILED DESCRIPTION

Figure 1:
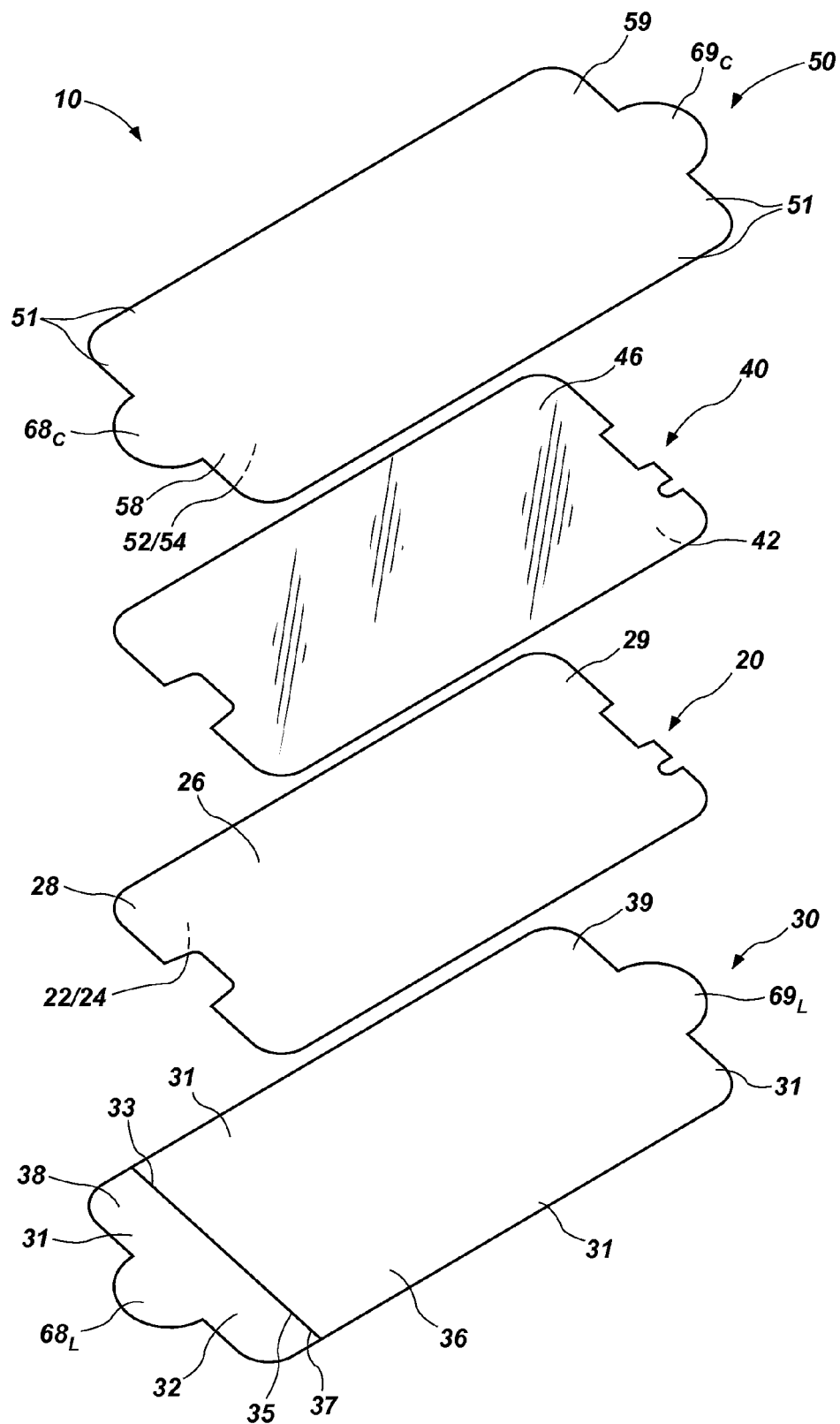
FIG. 1 is an assembly view of an embodiment of a system according to this disclosure.
Figure 2:
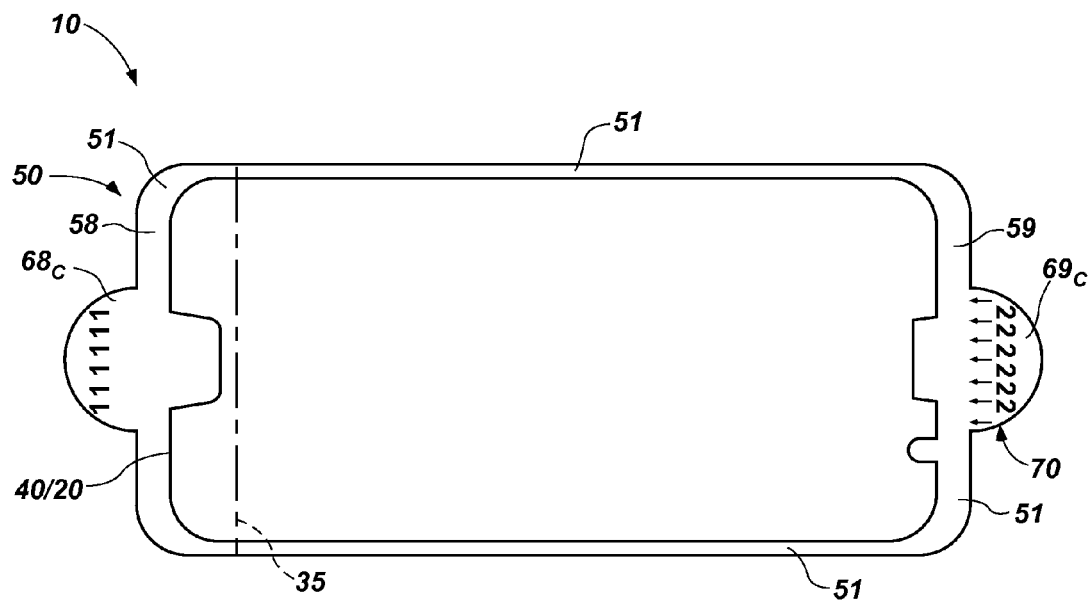
FIG. 2 is a top view of the embodiment of system shown in FIG. 1.
Figure 3:
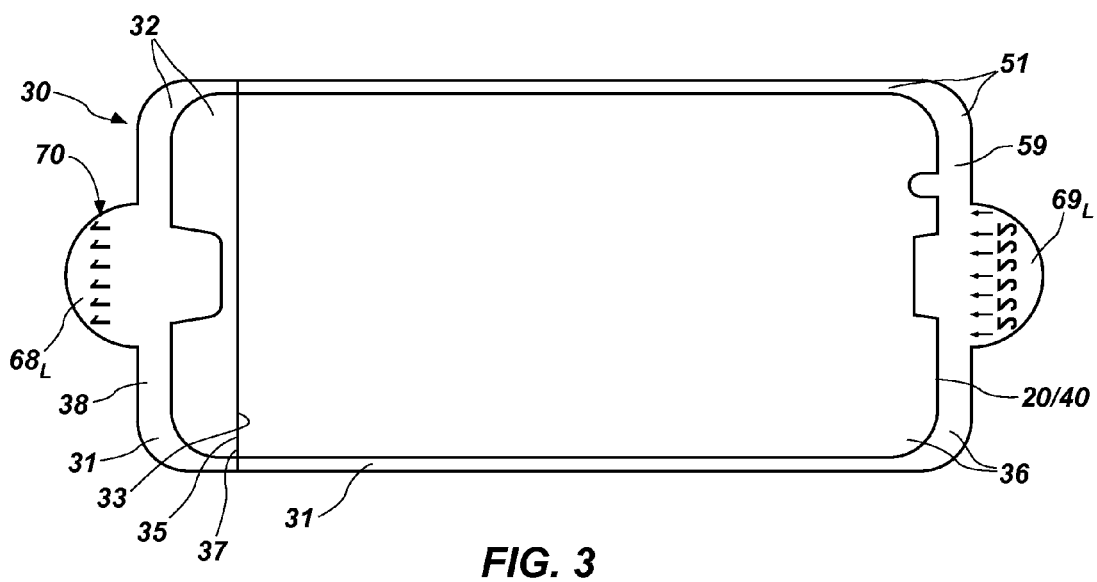
FIG. 3 is a bottom view of the embodiment of system shown in FIG. 1.

With reference to FIGS. 1, 2, and 3, an embodiment of a system 10 for protecting a surface of a substrate, such as an electronic device (e.g., a consumer electronic device, such as a smart phone, a portable media player, a tablet computing device, a wearable electronic device, a laptop computer, etc.) is illustrated. The system 10 includes a protective film 20 and a liner 30. Additionally, the system 10 may include a release layer 40, which may also function as an alignment element, and a cap shield 50.

The protective film 20 of the system 10 is configured to be secured to the surface of a substrate (not shown in FIGS. 1, 2, or 3) and to remain in place on the surface. A lower surface 22 of the protective film 20 may be coated with a suitable adhesive material 24, which may adhesively secure the lower surface 22 of the protective film 20 to the surface of the substrate. When the protective film 20 has been installed on a surface of a substrate, an upper surface 26, or an outer surface, of the protective film 20 will be exposed, and may comprise the surface with which a user interacts (e.g., by touching, with a stylus, etc.) when using the substrate or a feature thereof (e.g., a touch screen of a smart phone, tablet computing device, laptop computer, etc.).

In some embodiments, the protective film 20 may be formed from a plastic material, such as a polyurethane. A number of polyurethanes may provide desirable protective properties. In embodiments where the protective film 20 is transparent, a polyurethane may impart the protective film 20 with desirable optical properties (e.g., a clarity through which information or images may be viewed with little or no visible (to the naked eye, without image enhancement, etc.) distortion, etc.). For the sake of simplicity, the term "polyurethane," as used herein, includes polymers that include urethane, or "carbamate," linkages. A polyurethane may also include urea linkages, as well as combinations of urethane and urea linkages (e.g., poly(urethane-urea)s, etc.).

Other materials that may be suitable for use in forming the protective film 20 include polyvinyl chloride, polyvinyl acetate, polypropylene, polyester, poly(meth)acrylate, polyethylene, and rubbery resins (e.g., silicone elastomers, etc.). In other embodiments, the protective film 20 of a system 10 according to this disclosure may comprise glass.

The adhesive material 24 may comprise a pressure-sensitive adhesive material that will semi-permanently secure the protective film 20 to the surface of a substrate. In addition, the adhesive material 24 may be optically transparent. Example of adhesive materials with these properties include, but are not limited to, (meth)acrylates (e.g., acrylates, methacrylate, etc.), as well as adhesive materials that include chemistries based on natural and synthetic rubbers, polybutadiene and copolymers thereof, polyisoprene and copolymers thereof, and silicones (e.g., polydimethylsiloxane, polymethylphenylsiloxane, etc.). In a particular embodiment, the adhesive material 24 may include 2-ethyl hexyl acrylate, vinyl acetate, and polymerized acrylic acid monomers. Such an adhesive material is available from entrochem, inc., of Columbus, Ohio, under trade name ENTROCHEM™-ECA 340.

The embodiment of liner 30 depicted by FIGS. 1-3 may also be transparent. Such a liner 30 is secured to the adhesive material 24 on the lower surface of the protective film 20. A surface of the liner 30 that is positioned against the adhesive material 24 may have a smoothness that enables the liner 30 to be readily removed from the adhesive material 24 without pulling the adhesive material 24 from the lower surface 22 of the protective film 20. In some embodiments, the liner 30 may be relatively rigid, when compared with the rigidity of the protective film 20. Of course, the liner 30 may be flexible enough to enable it bend while being peeled from the adhesive material 24 on the lower surface 22 of the protective film 20. Without limitation, the liner 30 may be formed from a biaxially-oriented polyethylene terephthalate (Bo-PET) or a stretched polyester film (e.g., that marketed by du Pont de Nemours & Co. under the MYLAR® trademark, etc.).

As shown, the liner 30 may be divided into a strip liner 32 and a main liner 36. Adjacent edges 33 and 37 of the strip liner 32 and the main liner 36, respectively, may be completely separated from one another at a boundary 35, which may comprise a cut line. The cut line may extend completely through the liner 30 without extending into the lower surface 22 of the protective film 20. Alternatively, the boundary 35 may comprise a cut line that extends partially into the liner 30, a series of perforations extending across the liner 30 or a weakened line across the liner 30, or it may have any other suitable configuration.

The strip liner 32 may cover a strip 25 of the adhesive material 24 on the lower surface 22 of the protective film 20 at a location adjacent to a first end 28 of the protective film 20. The main liner 36 may cover a remainder of the adhesive material 24, from a location adjacent to the strip 25 to a second end 29 of the protective film 20.

The system 10 may include a release layer 40 on the upper surface 26 of the protective film 20. In some embodiments, a configuration of the release layer 40 (e.g., shape(s), dimensions, etc.) may be the same as, or identical to, a configuration of the protective film 20. The release layer 40 may be completely superimposed over the protective film 20.

A lower surface 42 of the release layer 40 may be positioned against the upper surface 26 of the protective film 20 without being adhesively secured to the upper surface 26 of the protective film 20. Rather, static electricity, by way of so-called "static cling," may releasably secure the lower surface 42 of the release layer 40 to the upper surface 26 of the protective film 20. The adhesive strength of the static cling between the release layer 40 and the protective film 20 may withstand (and even exceed) the strength with which the adhesive material 24 secures the liner 30 to the lower surface 22 of the protective film 20. This difference in adhesive strengths may enable removal of the liner 30 from the lower surface 22 of the protective film 20 while the upper surface 26 of the protective film 20 remains in place against the lower surface 42 of the release layer 40. The adhesive strength of the adhesive material 24 between the lower surface 22 of the protective film 20 and a surface of a substrate on which the protective film 20 is to be secured (e.g., a display of a portable electronic device, etc.) may, however, exceed the adhesive strength of static cling between the release layer 40 and the protective film 20, which may enable the lower surface 22 of the protective film 20 to remain in place on the surface against which it has been positioned when the release layer 40 is removed from (e.g., pulled away from, etc.) the upper surface 26 of the protective film 20.

In some embodiments, including those where the protective film 20, the liner 30 and any cap shield 50 are transparent, and where the release layer 40 has the same configuration as the protective film 20, the release layer 40 may be visible through the protective film 20, the liner 30 and any cap shield 50. Such visibility may be imparted by a combination of color and transparency, translucence, a visible border or in any other manner that will enable a surface of a substrate to be visualized through the release layer 40. Visibility of the release layer 40 through the protective film 20, the liner 30 and any cap shield 50 may enable use of the release layer 40 for precise alignment of the protective film 20 with the surface to which the protective film 20 is to be applied.

As indicated previously herein, in embodiments where a system 10 according to this disclosure includes a cap shield 50, the cap shield 50 may be transparent. The cap shield 50 may be configured to receive force and/or pressure applied to an upper surface 56 thereof and to distribute the same. The distribution of such force and/or pressure may protect (e.g., prevent denting of, prevent scuffing, scratching or other blemishing of, etc.) the protective film 20 before and during application of the protective film 20 to a surface of a substrate.

The cap shield 50 includes a lower surface 52 that is coated with an adhesive material 54. The adhesive material 54 may secure an upper surface 46 of the release layer 40 to the lower surface 52 of the cap shield 50. A strength with which the adhesive material 54 on the lower surface 52 of the cap shield 50 secures the upper surface 46 of the release layer 40 to the lower surface 52 may exceed a strength with which the lower surface 42 of the release layer 40 is secured to the upper surface 26 of the protective film 20, enabling removal of the release layer 40 from the protective film 20 when the cap shield 50 is pulled away from the protective film 20.

In some embodiments, cap shield 50 and the liner 30 may extend beyond an outer periphery 21 of the protective film 20. In a more specific embodiment, such as that depicted by FIGS. 1, 2, and 3, the cap shield 50 and the liner 30 may include peripheral portions 51 and 31, respectively, that extend beyond an entire outer periphery 21 of the protective film 20. In such embodiments, the adhesive material 54 on the peripheral portion 51 of the lower surface 52 of the cap shield 50 may secure the peripheral portion 31 of the liner 30 to the peripheral portion 51 of the cap shield 50.

Further, the adhesive material 54 may secure the peripheral portion 51 at a first end 58 of the cap shield 50 to the peripheral portion 31 at a first end 38 of the liner 30 with greater strength than the adhesive material 54 secures the peripheral portion 51 at a second end 59 of the cap shield 50 to the peripheral portion 31 at a second end 39 of the liner 30. This difference in adhesive strengths may be achieved in any of a number of different ways. Without limitation, such a differential adhesive strength may be achieved by adhering the peripheral portion 51 of the cap shield 50 to the peripheral portion 31 of the liner 30, lifting the peripheral portion 51 at the second end 59 of the cap shield 50 away from peripheral portion 31 at the second end 39 of the liner while leaving the peripheral portions 31 and 51 at the first ends 39 and 59 of the liner 30 and cap shield 50 in an adhered relation and re-adhering the second end 59 of the cap shield 50 to the second end 39 of the liner 30. As another example, differential adhesive strength may be achieved by use of different adhesive materials 54 or by use of different amounts of adhesive material 54 at the first end 58 and the second end 59 of the cap shield 50. Such processes may result in a "bumped" adhesive material 54 at the second end 59 of the cap shield 50.

In addition, a system 10 according to this disclosure may include tabs $68_C$ and $69_C$ at opposite ends thereof. More specifically, the tabs $68_C$ and $69_C$ may comprise extensions from the opposite first end 58 and the second end 59, respectively, of the cap shield 50. In some embodiments, the system may also include tabs $68_L$ and $69_L$ that extend from the opposite first end 38 and the second end 39, respectively, of the liner 30. Tabs $68_C$ and $68_L$ may be completely superimposed with respect to one another, and tabs $69_C$ and $69_L$ may be completely superimposed with respect to one another. The tabs $68_C$ and $69_C$ may enable a user to position the system 10 and the protective film 20 in a manner that provides an individual with more control over the application process than merely grasping the edges of the cap shield 50 and/or the protective film 20. Additionally, the tabs $68_C$ and $69_C$ may reduce the likelihood that an individual's hands will contact and contaminate the adhesive material 24 on the lower surface 22 of the protective film 22 as the protective film 22 is being applied to the surface of a substrate.

One or more of the tabs $68_C$, $68_L$, $69_C$, $69_L$ may include indicia 70. In the specific embodiment depicted by FIGS. 1-3, tab $68_L$ may include indicia 70 in the embodiment of the number "1", indicating that tab $68_L$ is the first tab to be pulled in the process of applying a protective film 20 to a surface of a substrate. When tab $68_L$ of the depicted embodiment is pulled, the strip liner 32 will be removed from the lower surface 22 of the protective film 20, which will expose the strip of 25 the adhesive material 24 on the lower surface 22 of the protective film 20.

Tab $69_C$ may include indicia 70 in the form of the number "2", which may indicate that tab $69_C$ is to be pulled at some point in time after tab $68_L$ to remove the cap shield 50 (and the release layer 40) from the upper surface 26 of the protective film 20. In some embodiments, the orientation of the indicia 70 on tab $69_C$ may be combined with bumping of the adhesive material 54 at the second end 59 of the cap shield 50 to prevent tab $68_C$ and the first end 58 of the cap sheild 50 from being pulled and the cap shield 50 (and, optionally, the release layer 40) from being removed from the protective film 20 prematurely; i.e., before the protective film 20 has been secured to a surface of a substrate.

Figure 1A:
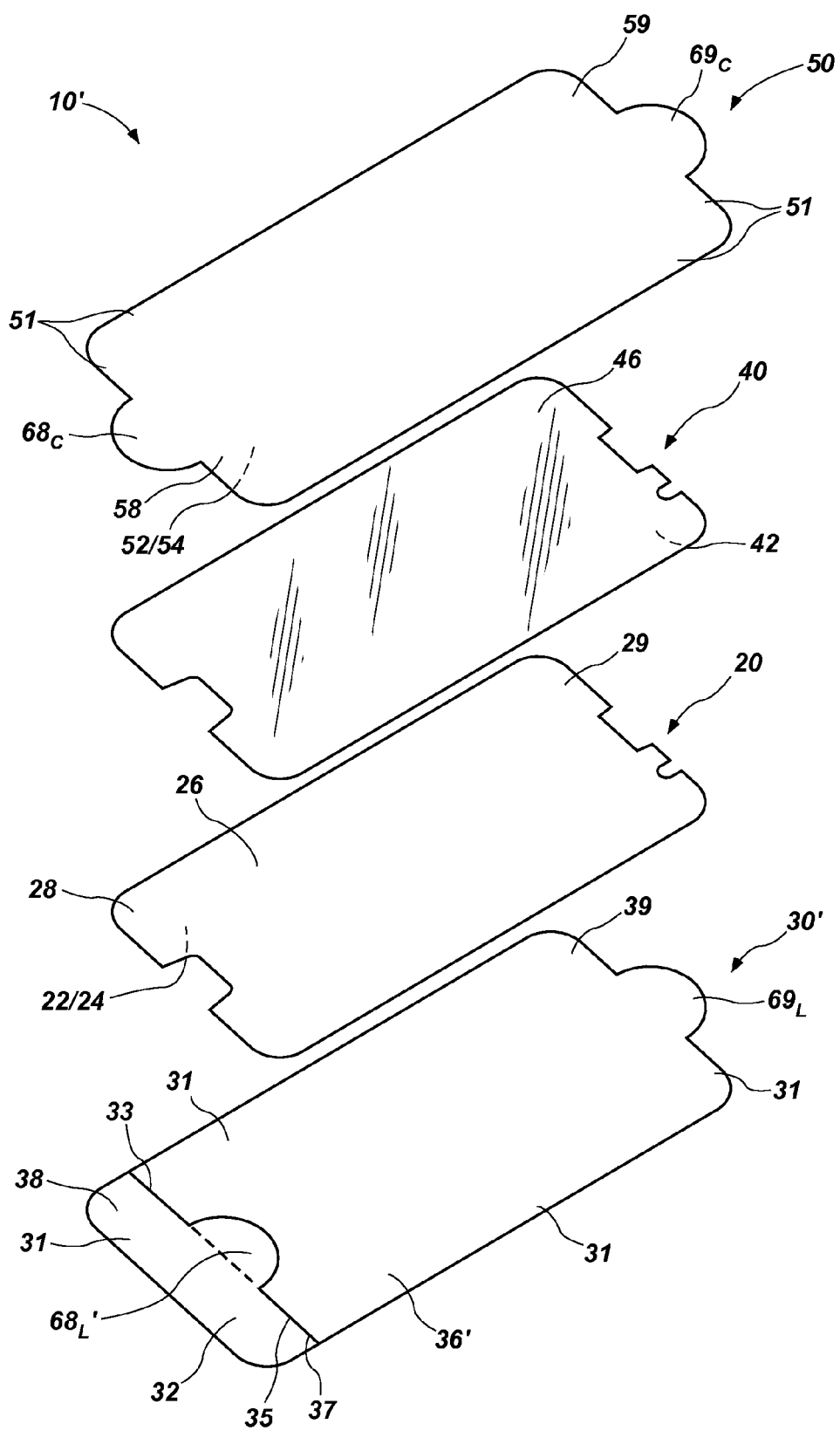
FIG. 1A is an assembly view of another embodiment of a system according to this disclosure.
Figure 2A:
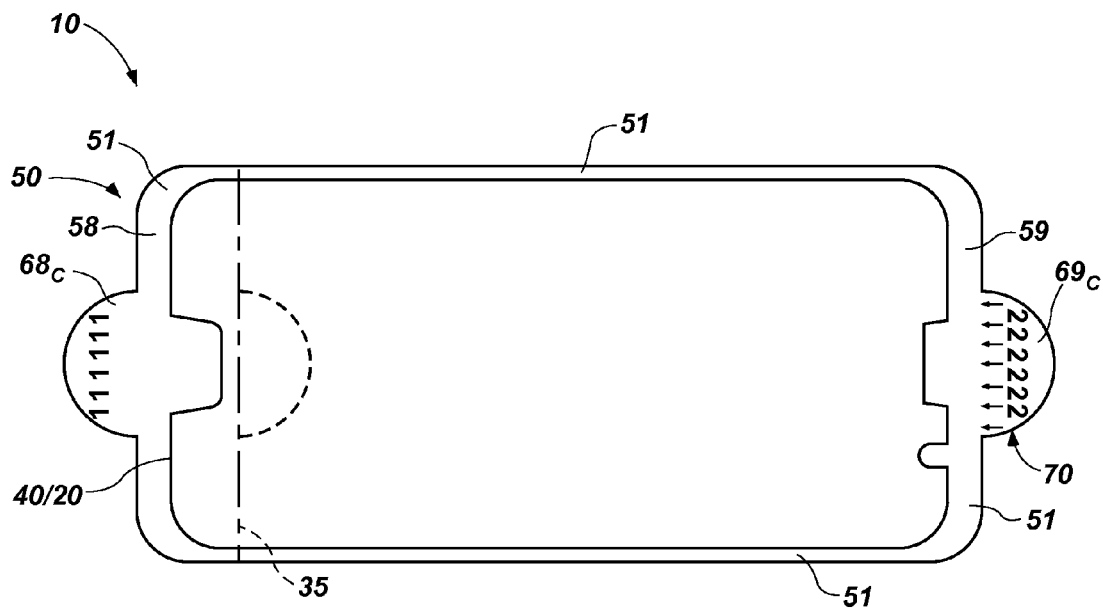
FIG. 2A is a top view of the embodiment of system shown in FIG. 1A.
Figure 3A:
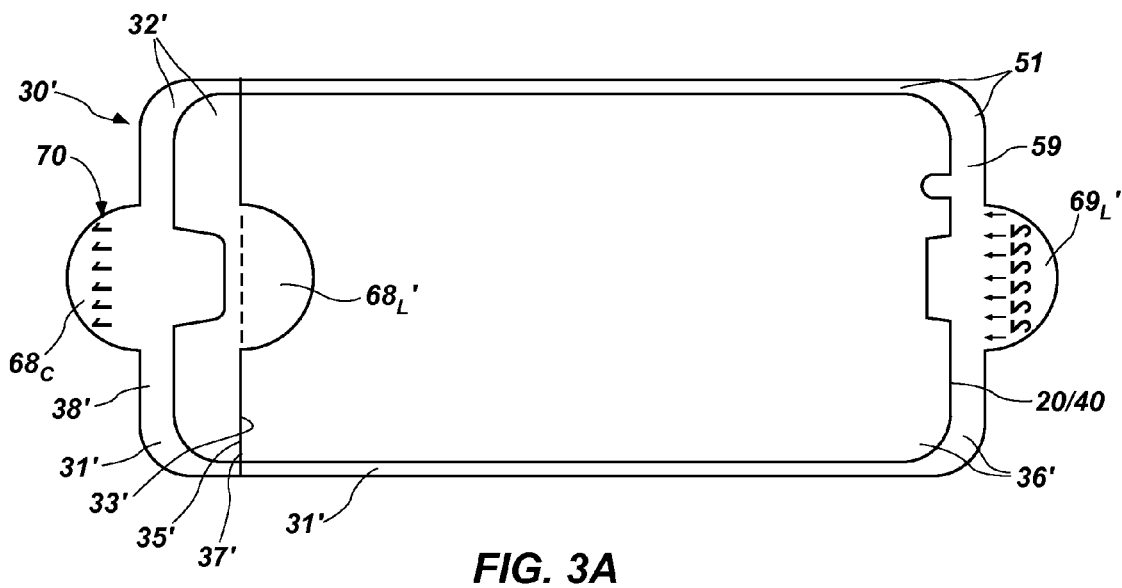
FIG. 3A is a bottom view of the embodiment of system shown in FIG. 1A.

FIGS. 1A, 2A and 3A depict a system 10' another embodiment of liner 30', in which the strip liner 32' includes a tab $68_L$' that is oriented toward, and may overlap, the main liner 36'. By orienting the tab $68_L$' in this manner, a user may grasp tabs $69_C$ and $69_L$ while pulling tab $68_L$' away from tabs $69_C$ and $69_L$ to remove the strip liner 32' from the main liner 36', as will be described in further detail hereinafter, with reference to FIG. 4. All of the other elements and features of the liner 30' may be the same as the corresponding elements and features of the liner 30 described in reference to FIGS. 1, 2, and 3. As such, the remaining reference numerals that are used in FIGS. 1-3 have been duplicated in FIGS. 1A, 2A and 3A, respectively.

Turning now to FIGS. 4-9, and with continued reference to FIGS. 1, 2, and 3, an embodiment of a method for applying a protective film 20 to a surface 102 of a substrate 100 is depicted.

Figure 4:
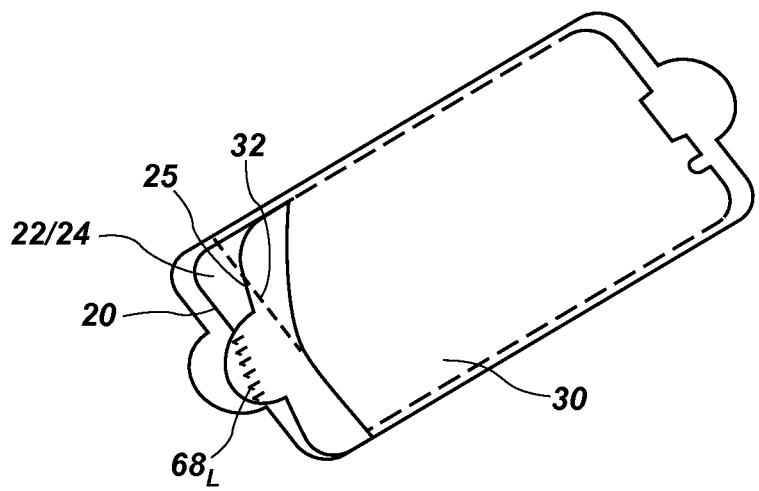
FIGS. 4-9 depict an embodiment of a method for applying a protective film to a surface of a substrate, such as a surface of an electronic device.

FIG. 4 shows tab 68L and the strip liner 32 portion of the liner 30 being pulled away from the adhesive material 24 on the lower surface 22 of a protective film 20. This exposes a strip 25 of the adhesive material 24 on the lower surface 22 of the protective film 20.

Figure 5:
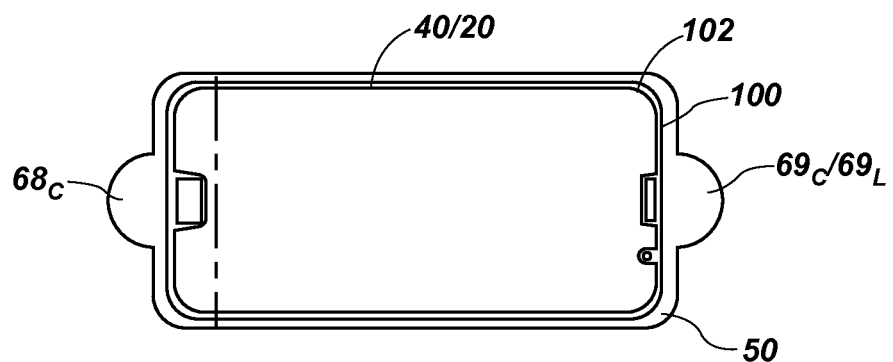

Once the strip 25 of adhesive material 24 has been exposed, the protective film 20 may be aligned with the surface 102 to which the protective film 20 is to be applied, as shown in FIG. 5. Specifically, FIG. 5 shows alignment of the release layer 40, which is visible through the cap shield 50 and the liner 30 (FIGS. 1-3), which has the same configuration as the protective film 20 and which is completely superimposed with the protective film 20, with the surface 102 of a display of a portable electronic device, such as a smart phone, a portable media player, a wearable electronic device or a tablet computing device. More specifically, an individual may grasp the tabs 68C and 69C/69L to align the release layer 40 and, thus, the protective film 20 with the surface 102 of the substrate 100.

Figure 6:
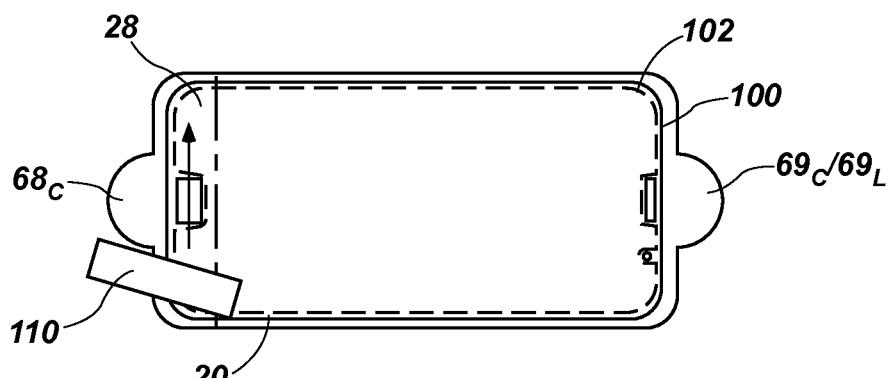

With the protective film 20 in alignment with the surface 102 to which the protective film 20 is to be adhered, the strip 25 of adhesive material 24 may be applied to the surface 102, as illustrated by FIG. 6, which will secure the first end 28 of the protective film 20 to the surface 102. The act of securing the first end 28 of the protective film 20 to the surface 102 may include applying the strip 25 (FIG. 4) of adhesive material 24 (FIG. 4) on the first end 28 to the surface 102 and pressing the first end 28 against the surface 102. Such pressure may be applied manually (e.g., with one or more fingers, etc.) and/or with a pressure application tool 110, such as a plastic card, a squeegee or the like.

Since only a relatively small strip 25 (FIG. 4) of adhesive material 24 (FIG. 4) is exposed and secured to the surface 102 of the substrate 100, if any misalignment has occurred (e.g., while securing the first end 28 of the protective film 20 to the surface, etc.), the first end 28 may be removed from the surface 102, the protective film 20 may be realigned with the surface 102 and the first end 28 of the protective film 20 may be re-secured to the surface 102 (e.g., with the strip 25 (FIG. 4) of the adhesive material 24 (FIG. 4), etc.). If such repositioning of the protective film 20 is desired or necessary, the first end 28 of the protective film 20 may be removed from the surface 102 by pulling tab $68_C$ and/or tabs $69_C$ and $69_L$ away from the surface 102.

As an alternative, the entire liner 30 may be removed from the lower surface 22 of the protective film 20 before any portion of the adhesive material 24 on the lower surface 22 contacts the surface 102. Such a technique may be employed in embodiments where the protective film 20 is rigid (e.g., formed from a glass, etc.) and/or when so-called "wet apply" processes are used. When such a technique is employed, the process steps shown and described in reference to FIGS. 7 and 8 may be omitted.

Figure 7:
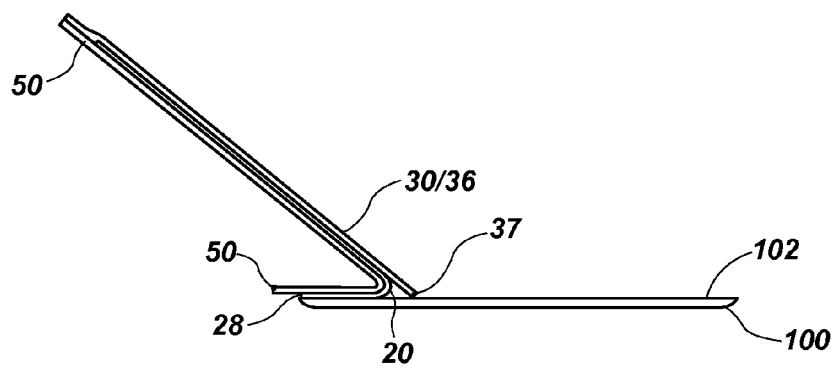

In some embodiments, including those where the protective film 20 comprises a flexible film, after the first end 28 of the protective film 20 has been adhesively secured to the surface 102 of the substrate 100, the second ends 29, 39 and 59 of the protective film 20, the liner 30 (i.e., the main liner 36) and the cap shield 50, respectively, may be lifted away from the surface 102, as depicted by FIG. 7. As these portions of the assembled elements of the system 10 are lifted away from the surface 102 and back over the first ends 58 and 28 of the cap shield 50 and the protective film 20, respectively, an edge 37 of the main liner 36 may peel away from the adhesive material 24 (FIG. 1) on the lower surface 22 (FIG. 1) of the protective film 20, and may rest against the surface 102 of the substrate 100.

Figure 8:
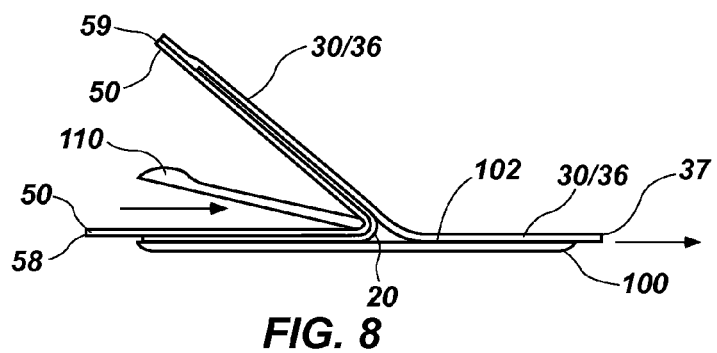
Figure 9:
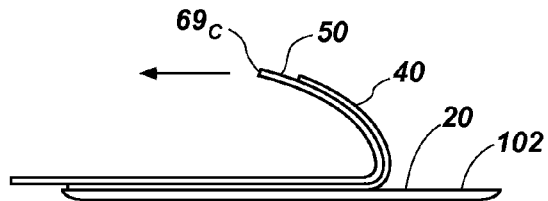

With the system 10 in the arrangement depicted by FIG. 7, as illustrated by FIG. 8, a force (e.g., a linear pressure front, etc.) may be applied across the cap shield 50 at a location adjacent to the first end 58 of the cap shield 50, and moved along the cap shield 50 over a length (or height) of the cap shield 50 toward its second end 59. Such force may be applied with a suitable application tool 110, such as a plastic card, a squeegee or the like. As force is applied in the direction illustrated by FIG. 8, the main liner 36 is removed from the adhesive material 24 on the lower surface 22 of the protective film 20 and the edge 37 of the main liner 36 moves along the surface 102 of the substrate 100 until the main liner 36 has been completely removed from the lower surface 22 of the protective film 20 and the protective film 20 has been fully secured to the surface 102.

Once the protective film 20 has been properly secured to the surface 102 of the substrate 100, the cap shield 50 and the release layer 40 may be removed from the upper surface 26 of the protective film 20. Removal of the cap shield 50 and the release layer 40 may be effected by pulling tab $69_C$ away from the surface 102. As illustrated, tab 69C and the second end 59 of the cap shield 50 may be pulled back across the protective film 20 and the surface 102 on which the protective film 20 resides.

Figure 10:
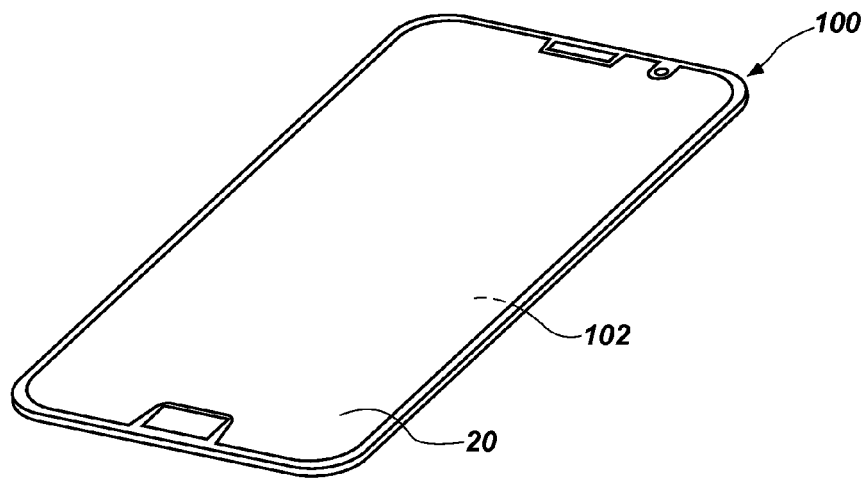
FIG. 10 shows an embodiment of a substrate with a protective film applied to a surface thereof.

With reference now turned to FIG. 10, an embodiment of a substrate 100 is shown with a surface 102 to which a protective film 20 has been applied. The substrate 100 may, without limitation, comprise a portable electronic device or a consumer electronic device, such as a smart phone, a portable media player, a tablet computing device, a wearable electronic device, a laptop computer or the like. The surface 102 of such a substrate 100 may comprise a display or any other feature that may be subjected to conditions that may, without the presence of a protective film 20 thereon, detrimentally affect the appearance of the surface 102.

Although the preceding disclosure provides many specifics, these should not be construed as limiting the scope of any of the ensuing claims. Other embodiments may be devised which do not depart from the scopes of the claims. Features from different embodiments may be employed in combination. The scope of each claim is, therefore, indicated and limited only by its plain language and the full scope of available legal equivalents to its elements.

What is claimed:

1. A method for applying a protective film to an electronic device, comprising:
   providing a protective film with a configuration that corresponds to a configuration of a surface of an electronic device on which the protective film is to be secured, the protective film including a lower surface that carries adhesive material for securing the protective film to the surface of the electronic device and an upper surface that is to be exposed when the protective film is secured to the surface of the electronic device;

removing a liner secured to the adhesive material on the lower surface of the protective film, including:
separating a liner strip of the liner from a main liner of the liner to enable the liner strip to be removed from the adhesive material on the lower surface of the protective film without removing the main liner from the adhesive material on the lower surface of the protective film, the separating comprising cracking the liner strip of the liner apart from the main liner of the liner to enable the liner strip to be removed from the adhesive material on the lower surface of the protective film without removing the main liner from the adhesive material on the lower surface of the protective film;
removing the liner strip from a first end of the protective film, the liner strip covering a strip of the adhesive material on the lower surface of the protective film at the first end of the protective film, the liner strip including a first tab protruding beyond the first end of the protective film so as to enable removal of the liner strip from the strip of the adhesive material;
applying the strip of the adhesive material to a corresponding location on the surface of the electronic device;
gradually removing the main liner from the adhesive material on the lower surface of the protective film, the main liner covering a remainder of the adhesive material on the lower surface of the protective film, from a location adjacent to the strip of the adhesive material to a second end of the protective film, the main liner including a second tab protruding beyond the second end of the protective film; and
while gradually removing the main liner from the adhesive material on the lower surface of the protective film, securing the adhesive material previously covered by the main liner to the surface of the electronic device, from the location adjacent to the strip of the adhesive material to the second end of the protective film;
applying pressure to a cap shield over the upper surface of the protective film, the cap shield distributing the pressure applied thereto over the protective film so as to adhesively secure the lower surface of the protective film to the surface of the electronic device and to prevent damage to the protective film as pressure is applied to the cap shield; and
after applying pressure to the cap shield, removing the cap shield from the upper surface of the protective film, a release layer positioned between the upper surface of the protective film and a lower surface of the cap shield enabling removal of the cap shield from the upper surface of the protective film without removing the protective film from the surface of the electronic device.

2. The method of claim 1, further comprising:
before applying pressure to the cap shield, pre-lifting the cap shield at the second end of the protective film and re-adhering the cap shield to the second end of the protective film, but not pre-lifting the cap shield the first end of the protective film, to enable a second end of the cap shield at the second end of the protective film to be more easily removed from the protective film than a first end of the cap shield at the first end of the protective film, and prevent removal of the cap shield instead of the liner strip from the first end of the protective film.

3. The method of claim 2, wherein removing the cap shield comprises grasping the second end of the cap shield or a tab protruding from the second end of the cap shield and pulling the second end of the cap shield away from the protective film and the surface of the electronic device.

4. The method of claim 1, further comprising:
aligning the release layer, having a color making it visible through the cap shield, with the surface of the electronic device before or while applying the strip of adhesive material to the corresponding location on the surface of the electronic device.

5. The method of claim 4, wherein aligning the release layer comprises:
grasping a first tab protruding beyond the first end of the protective film and superimposed with the first tab of the liner strip;
grasping a second tab protruding beyond the second end of the protective film and superimposed with the second tab of the main liner; and
moving the first tab and the second tab until the release layer is aligned with the surface of the electronic device.

6. A method for applying a protective film to an electronic device, comprising:
providing a protective film with a configuration that corresponds to a configuration of a surface of an electronic device on which the protective film is to be secured, the protective film including a lower surface that carries adhesive material for securing the protective film to the surface of the electronic device and an upper surface that is to be exposed when the protective film is secured to the surface of the electronic device;
cracking a liner strip of a liner secured to the adhesive material on the lower surface of the protective film apart from a main liner of the liner to enable the liner strip to be removed from the adhesive material without removing the main liner from the adhesive material;
removing the liner secured to the adhesive material on the lower surface of the protective film, including:
removing the liner strip from a strip of the adhesive material;
applying the strip of the adhesive material to a corresponding location on the surface of the electronic device; and
removing the main liner from a remainder of the adhesive material; and
applying pressure to the upper surface of the protective film so as to adhesively secure the lower surface of the protective film to the surface of the electronic device.

7. The method of claim 6, wherein removing the liner strip from the strip of the adhesive material includes removing the liner strip positioned at a first end of the protective film, the liner strip covering the strip of the adhesive material on the lower surface of the protective film at the first end of the protective film.

8. The method of claim 7, wherein removing the liner strip from the strip of adhesive material comprises grasping a first tab protruding beyond the first end of the protective film so as to enable removal of the liner strip from the strip of the adhesive material.

9. The method of claim 6, wherein removing the main liner from the remainder of the adhesive material comprises gradually removing the main liner from the remainder of the adhesive material.

10. The method of claim 6, wherein removing the main liner comprises grasping a second tab protruding beyond a second end of the protective film and, while grasping the second tab, pulling the second tab to pull the main liner away from at least a portion of the adhesive material.

11. The method of claim 6, wherein removing the main liner from the remainder of the adhesive material comprises gradually removing the main liner from the remainder of the adhesive material and, while gradually removing the main liner, securing the adhesive material previously covered by the main liner to the surface of the electronic device, from the location adjacent to the strip of the adhesive material to the second end of the protective film.

12. The method of claim 6, wherein applying pressure to the upper surface of the protective film comprises applying pressure to a cap shield over the upper surface of the protective film, the cap shield distributing the pressure applied thereto over the protective film so as to adhesively secure the lower surface of the protective film to the surface of the electronic device and to prevent damage to the protective film as pressure is applied to the cap shield.

13. The method of claim 12, further comprising:
   after applying pressure to the cap shield, removing the cap shield from the upper surface of the protective film, a release layer positioned between the upper surface of the protective film and a lower surface of the cap shield enabling removal of the cap shield from the upper surface of the protective film without removing the protective film from the surface of the electronic device.

14. A method for applying a protective film to an electronic device, comprising:
   providing a protective film with a configuration that corresponds to a configuration of a surface of an electronic device on which the protective film is to be secured, the protective film including a lower surface that carries adhesive material for securing the protective film to the surface of the electronic device and an upper surface that is to be exposed when the protective film is secured to the surface of the electronic device;
   pre-lifting a cap shield over the upper surface of the protective film at a second end of the protective film and re-adhering the cap shield to the second end of the protective film, but not pre-lifting the cap shield from a first end of the protective film, to enable a second end of the cap shield at the second end of the protective film to be more easily removed from the protective film than a first end of the cap shield at the first end of the protective film, and to prevent removal of the cap shield instead of a liner strip of a liner from the first end of the protective film;
   removing the liner secured to the adhesive material on the lower surface of the protective film, including:
      removing the liner strip positioned at the first end of the protective film, the liner strip covering a strip of the adhesive material on the lower surface of the protective film at the first end of the protective film, the liner strip including a first tab protruding beyond the first end of the protective film so as to enable removal of the liner strip from the strip of the adhesive material;
      applying the strip of the adhesive material to a corresponding location on the surface of the electronic device;
      gradually removing a main liner from the adhesive material on the lower surface of the protective film, the main liner covering a remainder of the adhesive material on the lower surface of the protective film, from a location adjacent to the strip of the adhesive material to the second end of the protective film, the main liner including a second tab protruding beyond the second end of the protective film; and
      while gradually removing the main liner from the adhesive material on the lower surface of the protective film, securing the adhesive material previously covered by the main liner to the surface of the electronic device, from the location adjacent to the strip of the adhesive material to the second end of the protective film;
   applying pressure to the cap shield, the cap shield distributing the pressure applied thereto over the protective film so as to adhesively secure the lower surface of the protective film to the surface of the electronic device and to prevent damage to the protective film as pressure is applied to the cap shield; and
   after applying pressure to the cap shield, removing the cap shield from the upper surface of the protective film, a release layer positioned between the upper surface of the protective film and a lower surface of the cap shield enabling removal of the cap shield from the upper surface of the protective film without removing the protective film from the surface of the electronic device.

15. The method of claim 14, further comprising:
   aligning the release layer, having a color making it visible through the cap shield, with the surface of the electronic device before or while applying the strip of adhesive material to the corresponding location on the surface of the electronic device.

16. The method of claim 15, wherein aligning the release layer comprises:
   grasping a first tab protruding beyond the first end of the protective film and superimposed with the first tab of the liner strip;
   grasping a second tab protruding beyond the second end of the protective film and superimposed with the second tab of the main liner; and
   moving the first tab and the second tab until the release layer is aligned with the surface of the electronic device.

17. A method for applying a protective film to an electronic device, comprising:
   providing a protective film with a configuration that corresponds to a configuration of a surface of an electronic device on which the protective film is to be secured, the protective film including a lower surface that carries adhesive material for securing the protective film to the surface of the electronic device and an upper surface that is to be exposed when the protective film is secured to the surface of the electronic device;
   pre-lifting a cap shield over the upper surface of the protective film at a second end of the protective film and re-adhering the cap shield to the second end of the protective film, but not pre-lifting the cap shield from a first end of the protective film, to enable a second end of the cap shield at the second end of the protective film to be more easily removed from the protective film than a first end of the cap shield at the first end of the protective film, and to prevent removal of the cap shield instead of a liner strip of a liner on the adhesive material on the lower surface of the protective film from the first end of the protective film;
   removing the liner from the adhesive material on the lower surface of the protective film; and
   applying pressure to the upper surface of the protective film so as to adhesively secure the lower surface of the protective film to the surface of the electronic device.

18. The method of claim 17, wherein removing the liner includes:
removing the liner strip positioned at the first end of the protective film, the liner strip covering a strip of the adhesive material on the lower surface of the protective film at the first end of the protective film, the liner strip including a first tab protruding beyond the first end of the protective film so as to enable removal of the liner strip from the strip of the adhesive material; and
applying the strip of the adhesive material to a corresponding location on the surface of the electronic device.

19. The method of claim 18, wherein removing the liner further includes:
gradually removing a main liner from the adhesive material on the lower surface of the protective film, the main liner covering a remainder of the adhesive material on the lower surface of the protective film, from a location adjacent to the strip of the adhesive material to the second end of the protective film, the main liner including a second tab protruding beyond the second end of the protective film.

20. The method of claim 19, further comprising:
while gradually removing the main liner from the adhesive material on the lower surface of the protective film, securing the adhesive material previously covered by the main liner to the surface of the electronic device, from the location adjacent to the strip of the adhesive material to the second end of the protective film.

* * * * *